UNITED STATES PATENT OFFICE 2,692,840

SINGLE PACKAGE PRIMARY CHEMICAL TREATMENT COMPOSITION

Ernest P. Bell, Detroit, Mich., assignor to Parker Rust Proof Company, Detroit, Mich., a corporation of Michigan No Drawing. Application November 19, 1951, Serial No. 257,186

14 Claims. (Cl. 148—6.16)

This invention relates to the primary chemical treatment of metallic surfaces such as steel, zinc, and aluminum. More particularly, this invention concerns the method of treating such surfaces to provide a base for paint and to produce a corrosion-resistant coating thereon and a solution for producing such coatings.

Resinous materials containing active hydroxyl groups and resins having oxidizable unsaturation when dissolved in suitable solvents in the presence of only small quantities of chromic acid either form undesirable gels, detrimentally reduce the chromium or otherwise reduce the effectiveness of the coating. Basic zinc chromate, such as zinc tetroxy chromate, which is highly desirable and for a majority of applications generally considered essential as a constituent of formulations for the primary treatment of metallic surface, releases chromic acid in the presence of phosphoric acid. It is well known that phosphates are particularly beneficial as constituents in metal treating solutions and that substitute solutions not containing the PO₄ radical are generally inferior thereto in forming corrosion-resistant coatings on metals which are suitable as a base for paint. The combination of phosphoric acid, basic zinc chromate and resinous material containing active hydroxyl groups has heretofore been proposed in U. S. Patent 2,525,107. This material is subject to a number of disadvantages, the most important of which is that it is necessary to package the phosphoric acid separately from the other ingredients and particularly the basic zinc chromate. In the use of this material, it has been the practice to mix the phosphoric acid with the other ingredients immediately prior to use, inasmuch as the mixture should be used within about 6 to 8 hours after mixing if beneficial results are to be obtained. A second disadvantage of this material is that the presence of free phosphoric acid has necessitated the use of glass containers.

It is therefore one of the objects of this invention to provide a superior composition for the primary chemical treatment of metallic surfaces and one which can be provided in a single package in contrast to the two package compositions hitherto known.

A further object is to provide a method of treating metallic surfaces with a single-package primary chemical treatment composition of this invention.

Another object of this invention is to provide a composition for the primary chemical treatment of metallic surfaces which can be compounded, handled, stored and transported in conventional equipment.

Other objects and advantageous features of the invention will be specifically pointed out or will become apparent as the specification is considered in its entirety.

The present invention is concerned with formulations of the general type disclosed in U. S. Patent 2,525,107 and is based primarily on the discovery that such formulations may be rendered stable during long storage periods and packaged in a single package for shipment without gelation or harmful deterioration. It has now been found that stability is imparted to a solution containing basic zinc chromate, a film forming resinous material containing active hydroxyl groups or oxidizable unsaturation and the PO₄ radical if the PO₄ radical is supplied as a phosphate having the following structure:

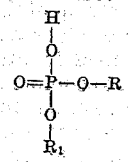

where R is selected from the group of radicals consisting of hydrogen, ammonium and substituted ammonium, and $R_1$ is selected from the group of radicals consisting of ammonium and substituted ammonium and the pH is maintained between about 6 and 9. Compositions of this general type have been found to retain all the desirable attributes of the heretofore known materials in which the phosphate radical resulted from the presence of phosphoric acid and concurrently substantially eliminate the tendency for the material to interact and form an undesirable gel or reduce the chromium. The explanation for the behavior of these formulations is not completely understood but it is believed that the presence of the ammonium radical or the substituted ammonium radical reduces the acidity of the solution such that the basic zinc chromate does not harmfully react with the PO₄ containing material. Of the materials having the above given formula, particularly good results have been obtained with diammonium phosphate, guanylurea phosphate, dimorpholine phosphate and ditrimethyl ammonium phosphate. As used in this specification and the appended claims, the term "substituted ammonium" is intended to mean that the ammonium radical is substituted with alkyl, aryl or heterocyclic radicals having 1 to 12 carbon atoms.

Formulations within the broad contemplation of this invention may have the following composition:

| | Per cent |
|---|---|
| Basic zinc chromate | 2–16 |
| Film forming resinous material | 2–16 |

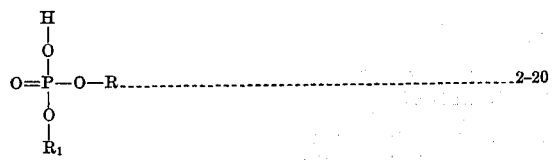
................2–20

| | |
|---|---|
| Solvents capable of dissolving the resin constituent | 60–85 |

The above formulation can be improved as to stability by the inclusion therein of a filler material having soft settling properties. These properties are beneficial in counteracting the tendency of basic zinc chromate to settle and become compacted into a stiff mass which is difficult to redisperse. A wide variety of materials may be utilized for this purpose including finely ground clay-type materials, mineral fiber-type materials such as asbestos, etc. Pigment grade clay has been found to be especially suitable for this purpose.

The basic zinc chromate portion of the formulation in combination with the $PO_4$ portion forms on the metallic surface a chemical corrosion inhibiting coating. Basic zinc chromate, commonly known as zinc tetroxy chromate having the formula, $ZnCrO_4 \cdot 4Zn(OH)_2$, and essentially free from soluble carbonates and similar corrosion inciting materials is superior to other zinc chromate materials which are included under the broad term zinc chromate or zinc yellow. Beneficial effects in resistance to corrosion are noticeable when the concentration of basic zinc chromate reaches about 2% and proportions up to about 16% may be used without detrimental effect. Amounts above 16% however produce no further contribution to the corrosion-resistant properties of the coating and are not recommended.

The film forming resinous material referred to in the above formulation may be any resinous material which is compatible with the other ingredients of the composition in the proportions given, i. e., the resin should be compatible with a substantially nonaqueous solution containing the $PO_4$ radical and chromic acid in the pH range of about 6 to 9. Among the resinous compositions falling within this category, particularly good results have been obtained with polyvinyl butyral resins and alkyd resins of various degrees of oil modification as well as rosin modified alkyds. Limited success has been achieved with polyamide resins. Admixtures of these resins are also satisfactory and are contemplated within the term "film forming resinous material." Proportions of resin as low as 2% and as high as about 16% have been found to produce a thin coating which provides good protection against corrosion and which is adherent and cohesive.

The formulations of this invention preferably assume the form of a dispersion or an emulsion in case water is present. The compounding of dispersions of the desired fluidity to enable spray or brush application is achieved by adding to the other ingredients a solvent capable of dissolving the selected resin in an amount sufficient to provide the desired fluidity. In the case of polyvinyl butyral resins, suitable solvents include alcohols, such as, methanol, ethanol, propanol, etc.; glycol ethers such as, methyl, ethyl ethers of ethylene glycol, diethylene ether of ethylene glycol, diethylene ether of diethylene glycol, etc.; and esters, such as ethyl acetate, n-butyl acetate, etc. Anhydrous alcohols, however, are not particularly satisfactory and commercial alcohols are preferred because they contain small proportions of water. The presence of approximately 1½% to 6% water by weight of the total composition markedly increases the solubility of polyvinyl butyral in alcohols.

Mixtures of alcohols, ketones, esters and aromatic hydrocarbons may also be used but the proportion of alcohol in such mixtures preferably is maintained above about 30% of the mixture. For example, satisfactory results have been obtained from mixtures containing 40% isopropanol and 60% respectively of acetone, methyl isobutyl ketone, ethyl acetate, toluene and xylene.

Polyamides most easily dissolve in alcohols of medium chain lengths, that is, alcohols above ethanol such as propyl, n-butyl, tertiary amyl alcohols, methyl isobutyl carbinal and cyclohexanol. It is permissible to admix such alcohols with aromatic hydrocarbons such as toluene, xylene or petroleum naphtha, but it is preferred that the alcohol portion of the solvent mixture contain at least 30% alcohol. Where the resin portion of the formulation is a polyamide, ketones or petroleum naphtha alone should not be used.

Alkyd resins are soluble in hydrocarbon type solvents such as toluene, xylene, naphtha, etc. It will be apparent to one skilled in the art that the solvent chosen will be one which will satisfactorily dissolve the selected resin, and the minimum quantity which should be employed is that proportion which will completely dissolve the resin and enable the formation of a stable dispersion in the presence of the other ingredients. Proportions of solvents between about 6% and 40% by weight of the total composition are sufficient to dissolve the resin depending upon the amount which is present in the formulation. In order to secure the fluidity required for satisfactory commercial spray application, however, it has been found desirable to increase the solvent percentage from about 50% to about 85% of the total composition. Smaller proportions of solvents are suitable where the composition is applied with the brush, and in this case quantities of solvent sufficient to form a dispersion of the ingredients to a consistency approximating common paint is satisfactory.

For the purposes of this invention, pH of the substantially non-aqueous compositions of about 6 to 9 refers to the pH obtained by employing a sample of the composition containing the indicated proportions of non-aqueous solvents in a conventional industrial glass and calomel electrode pH meter. No water is intentionally added to the composition. Compositions having pH's below about 6 were found to form undesirable gels, or if no gel was formed to produce coatings which were inferior in corrosion resistance to those produced from compositions having a pH of 6 to 9. Solutions having a pH above about 9 likewise were found to produce inferior corrosion resistant coatings.

The following examples are given to illustrate the method of compounding and typical compositions containing representative phosphate radical source materials which have proved effective in inhibiting the corrosion of steel, zinc, and aluminum surfaces and which formed thereon a satisfactorily receptive base for paint. All percentages are by weight.

*Example I*

| | Per cent |
|---|---|
| Polyvinyl butyral resin | 7 |
| Zinc tetroxy chromate | 2 |
| Pigment grade clay | 4.3 |
| Diammonium phosphate | 7.6 |
| Water | 3.1 |
| Isopropanol | 62 |
| Methyl isobutyl ketone | 14 |

Polyvinyl butyral resin was ball milled into the alcohol and ketone for 18 hours. The zinc chromate and clay were then added and the mixture was ball milled for 24 hours. The water and diammonium phosphate were admixed and added to the ball milled mixture and the entire batch was ball milled for another 24 hours. The above mixture was then applied to previously cleaned surfaces of mild steel, aluminum and zinc at room temperature. Some of the surfaces were dried at 200° F. in 30 minutes and others for 8–12 hours at room temperature and the resultant coatings were found to have a thickness varying from approximately 0.1 to 0.8 mil. The surfaces were thereafter painted with a finish coating such as a compatible alkyd resin or vinyl base paint and each gave excellent results in salt spray tests. Coating thicknesses below about 0.1 mil gave somewhat inferior corrosion resistance to the more desirable thickness of 0.1 mil to 0.8 mil and the preferred thickness is .3 to .8 mil. Films having a thickness greater than 0.8 mil gave satisfactory results but no particular advantage in quality. The composition as admixed was found to retain its original characteristics after storage for 8 months and coatings produced by the use of the 8 months old composition were comparable in every respect to the coatings formed by the fresh composition. It was also found satisfactory to compound all the ingredients and ball mill the batch for 24 hours rather than utilize separate ball-milling steps. Suitable drying times were found to vary from 5 to 30 minutes at 200° F. and from 15 minutes to 12 hours at room temperature.

*Example II*

The formulation of Example I was varied by increasing the proportion of zinc chromate to 5.5%, 13.2%, and 16% and correspondingly reducing the amount of isopropanol. The formulations were compounded in a manner similar to that set forth under Example I and similar results were obtained from the application of the solutions to steel, zinc and aluminum surfaces.

*Example III*

| | Per cent |
|---|---|
| Polyvinyl butyral | 2 |
| Zinc tetroxy chromate | 6.1 |
| Pigment grade clay | .5 |
| Guanylurea phosphate | 4.0 |
| Water | 1.5 |
| Methyl isobutyl ketone | 13.1 |
| Isopropanol | 72.8 |

The resin was compounded similarly to that of Example I and the results obtained were comparable to those of Example I.

*Example IV*

| | Per cent |
|---|---|
| Polyvinyl butyral | 16 |
| Zinc tetroxy chromate | 8 |
| Pigment grade clay | 1 |
| Guanylurea phosphate | 10 |
| Water | 3.1 |
| Methyl isobutyl ketone | 13.2 |
| Isopropanol | 48.7 |

The resin was compounded similarly to that of Example I and the results obtained were comparable to those of Example I.

*Example V*

Example I was repeated substituting ditrimethyl, ammonium phosphate in one series of tests and substituting dimorpholine phosphate in a second series of tests. The results obtained from the application of coatings on surfaces of zinc, steel and aluminum were comparable to those obtained in Example I.

*Example VI*

The formulations of Example II were repeated substituting ditrimethyl ammonium phosphate in one series of tests and dimorpholine phosphate in another series of tests in the place of diammonium phosphate. The results obtained were similar to those obtained in Example II.

*Example VII*

| | Per cent |
|---|---|
| Rosin modified alkyd resin | 8.7 |
| Zinc tetroxy chromate | 8.3 |
| Asbestos base filler | 1.3 |
| Diammonium phosphate | 4.7 |
| Xylene | 77 |

The rosin modified alkyd resin used in this formulation was specifically one supplied by the Reichold Chemical Company and designated as "Beckosol 3" while, the asbestos base filler is known in the trade as "Asbestine," supplied by International Talc Company. This formulation was compounded by adding the xylene to the alkyd resin and ball milling for 2 hours, adding the zinc chromate and filler and ball milling for 24 hours. To this mixture is then added the diammonium phosphate and the entire mixture is ball milled for another 24 hours. The diammonium phosphate was finely powdered by ball milling for 48 hours prior to its admixture with the other ingredients.

This mixture was applied to surfaces of steel, zinc and aluminum both by spraying and brushing, and the resultant coatings were adherent, corrosion-resistant and had thicknesses between about .3 and .8 mil. A finished coating of paint applied to the surfaces was found after an elongated exposure to salt spray to be free of bubbles, pits and corrosion. This material was found to retain its ability to form corrosion-resistant and paint receptive coatings after storage for 6 months.

*Example VIII*

Example VII was repeated by substituting guanylurea phosphate for diammonium phosphate in one series of tests, dimorpholine phosphate in another series of tests and ditrimethyl ammonium phosphate in a third series of tests. Comparable results were obtained to those specified in Example VII.

*Example IX*

| | Per cent |
|---|---|
| Polyamide resin | 7.9 |
| Zinc tetroxy chromate | 7.5 |
| Asbestos base filler | 1.2 |

Tertiary amyl alcohol _____ 21
Toluene _____ 49.1
Guanylurea phosphate _____ 13.3

This formulation was compounded by ball milling the polyamide resin in the solvent for 24 hours and then adding the other constituents and ball milling for another 24 hours. Application of this dispersion to the surfaces of steel, zinc and aluminum formed evenly distributed and adherent coatings which were an excellent base for paint. These various surfaces after painting and exposing to salt spray tests were found to be in excellent condition.

Example X

Example IX was repeated by substituting diammonium phosphate, ditrimethyl ammonium phosphate and dimorpholine phosphate for the guanylurea phosphate and the results were comparable to those of Example IX.

Example XI

Example I was repeated with the exception that the proportion of diammonium phosphate was varied from 3% to 14% by concurrently reducing the amount of solvent. The coatings on the surfaces of steel, zinc and aluminum and the storage stability of the dispersions were found to be comparable to those obtained in Example I.

Illustrative examples of other amine phosphates that may be used in like proportions, in addition to those hereinbefore mentioned, are:

Monomethyl amine phosphate
Ethyl amine phosphate
Isopropyl amine phosphate
Monoethanol amine phosphate
Diamyl amine phosphate
2-amino-2-methyl-1-propanol amine phosphate
Furfural amine phosphate
Cyclohexyl amine phosphate
Diethylene triamine phosphate
P-phenylene diamine phosphate
P-amino phenol phosphate
Tertiary octyl amine phosphate
Hexamethylene tetramine phosphate
Phenyl morpholine phosphate
Dicyclohexyl amine phosphate
Octadecyl amine phosphate
Tri-n-butyl amine phosphate
Di-n-butyl amine phosphate
Ethylene diamine phosphate Of the above listed phosphates, the following members thereof constitute a secondarily preferred class:

Isopropyl amine phosphate
Diamyl amine phosphate
2-amino-2-methyl-1-propanol phosphate
Cyclohexyl amine phosphate
Tertiary octyl amine phosphate
Ethylene diamine phosphate It will be understood that the pH of the solution could be raised above 9 by the addition of free ammonium hydroxide or free amine to create pH's as high as about 11. In use and operation, however, it is believed that the excess ammonium hydroxide or amine which is present volatilizes to an extent such that the solution which is in actual contact with the surface of the metal being treated has a pH falling within the range of about 6 to about 9.

What is claimed is:

1. A chemical composition for the primary treatment of the surfaces of metals of the group consisting of steel, zinc and aluminum consisting essentially of 2%–16% basic zinc chromate; 2%–16% of at least one resin selected from the group consisting of polyvinyl butyral, alkyd resins and polyamide resins, a suitable solvent therefor and 2%–20% of phosphate of the following structure:

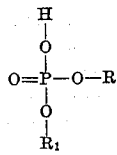

wherein R is selected from the group of radicals consisting of hydrogen, ammonium and substituted ammonium and $R_1$ is selected from the group consisting of ammonium and substituted ammonium, the pH of said composition being from 6 to 9.

2. A chemical composition for the primary treatment of the surfaces of metals of the group consisting of steel, zinc and aluminum consisting essentially of 2%–16% basic zinc chromate; 2%–16% of at least one resin selected from the group consisting of polyvinyl butyral, alkyd resins and polyamide resins, a suitable solvent therefor and 2%–20% of a phosphate selected from the group consisting of diammonium phosphate, guanylurea phosphate, dimorpholine phosphate and ditrimethyl ammonium phosphate, the pH of said composition being from 6 to 9.

3. A chemical composition for the primary treatment of the surfaces of metals of the group consisting of steel, zinc and aluminum which consists essentially of 2%–16% basic zinc chromate; 2%–16% of at least one resin selected from the group consisting of polyvinyl butyrals, alkyds and polyamides, a suitable solvent therefor and 2%–20% of diammonium phosphate, the pH of said composition being from 6 to 9.

4. A chemical composition for the primary treatment of the surfaces of metals of the group consisting of steel, zinc and aluminum which consists essentially of 2%–16% basic zinc chromate; 2%–16% of at least one resin selected from the group consisting of polyvinyl butyral, alkyds and polyamides, a suitable solvent therefor and 2%–20% of guanylurea phosphate, the pH of said composition being from 6 to 9.

5. A chemical composition for the primary treatment of the surfaces of metals of the group consisting of steel, zinc and aluminum which consists essentially of 2%–16% basic zinc chromate; 2%–16% of at least one resin selected from the group consisting of polyvinyl butyrals, alkyds, and polyamides, a suitable solvent therefor and 2%–20% of dimorpholine phosphate, the pH of said composition being from 6 to 9.

6. A chemical composition for the primary treatment of the surfaces of metals of the group consisting of steel, zinc and aluminum which consists essentially of 2%–16% basic zinc chromate; 2%–16% of at least one resin selected from the group consisting of polyvinyl butyral, alkyds and polyamides, a suitable solvent therefor and 2%–20% of ditrimethyl ammonium phosphate, the pH of said composition being from 6 to 9.

7. The method of forming a coating as a paint base on a metal of the group consisting of steel, zinc and aluminum, said method comprising the steps of contacting the surface of said metal with a composition consisting essentially of 2%–16% basic zinc chromate, 2%–16% of at least one resin selected from the group consisting of polyvinyl butyral, alkyd resins and polyamide resins, a suitable solvent for said resin and 2%–20% of phosphate of the following structure:

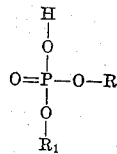

wherein R is selected from the group of radicals consisting of hydrogen, ammonium and substituted ammonium, and $R_1$ is selected from the group consisting of ammonium and substituted ammonium, said resin being compatible with the said chromate and phosphate over a pH range of 6 to 9, maintaining the said composition in contact with said surface until a protective film is formed thereon, and thereafter drying said film on said surface.

8. The method of forming a relatively thin coating as a paint base on a metal of the group consisting of steel, zinc and aluminum, said method comprising the steps of contacting the surface of said metal with 2%–16% basic zinc chromate, 2%–16% of at least one resin selected from the group consisting of polyvinyl butyral, alkyd resins and polyamide resins, a suitable solvent for said resin and 2%–20% of a phosphate selected from the group consisting of diammonium phosphate, guanylurea phosphate, dimorpholine phosphate, ditrimethyl ammonium phosphate, said composition having a pH between 6 and 9, to form a film having a thickness between 0.1 and 0.8 mil by reaction between the said base metal and the said composition, and subsequently drying the reaction product film.

9. The method of forming a relatively thin coating as a paint base on a metal of the group consisting of steel, zinc and aluminum, said method comprising the steps of contacting the surface of said metal with a composition consisting essentially of 2%–16% basic zinc chromate, 2%–16% of at least one resin selected from the group consisting of polyvinyl butyral, alkyd resins and polyamide resins, a suitable solvent for said resin, and 2%–20% of diammonium phosphate, said composition having a pH between 6 and 9, to form a film having a thickness between 0.1 and 0.8 mil by reaction between the said base metal and the said composition, and subsequently drying the reaction product film.

10. The method of forming a relatively thin coating as a paint base on a metal of the group consisting of steel, zinc and aluminum, said method comprising the steps of contacting the surface of said metal with a composition consisting essentially of 2%–16% basic zinc chromate, 2%–16% of at least one resin selected from the group consisting of polyvinyl butyral, alkyd resins and polyamide resins, a suitable solvent for said resin, and 2%–20% of guanylurea phosphate, said composition having a pH between 6 and 9, to form a film having a thickness between 0.1 and 0.8 mil by reaction between the said base metal and the said composition, and subsequently drying the reaction product film.

11. The method of forming a relatively thin coating as a paint base on a metal of the group consisting of steel, zinc and aluminum, said method comprising the steps of contacting the surface of said metal with a composition consisting essentially of 2%–16% basic zinc chromate, 2%–16% of at least one resin selected from the group consisting of polyvinyl butyral, alkyd resins and polyamide resins, a suitable solvent for said resin and 2%–20% of dimorpholine phosphate, said composition having a pH between 6 and 9, to form a film having a thickness between 0.1 and 0.8 mil by reaction between the said base metal and the said composition, and subsequently drying the reaction product film.

12. The method of forming a relatively thin coating as a paint base on a metal of the group consisting of steel, zinc and aluminum, said method comprising the steps of contacting the surface of said metal with a composition consisting essentially of 2%–16% basic zinc chromate, 2%–16% of at least one resin selected from the group consisting of polyvinyl butyral, alkyd resins and polyamide resins, a suitable solvent for said resin and 2%–20% of ditrimethyl ammonium phosphate, said composition having a pH between 6 and 9, to form a film having a thickness between 0.1 and 0.8 mil by reaction between the said base metal and the said composition, and subsequently drying the reaction product film.

13. An article comprising a structure fabricated from a metal selected from the group consisting of steel, zinc and aluminum having thereon a coating having a thickness between about .1 and .8 mils and being the reaction product formed by contacting the said metallic surface with a composition consisting essentially of 2%–16% basic zinc chromate, 2%–16% of at least one resin selected from the group consisting of polyvinyl butyral, alkyd resins and polyamide resins and 2%–20% of a phosphate of the following structure:

wherein R is selected from the group of radicals consisting of hydrogen, ammonium and substituted ammonium and $R_1$ is selected from the group consisting of ammonium and substituted ammonium, said resin being compatible with the said chromate and phosphate over a pH range of 6 to 9.

14. An article comprising a structure fabricated from a metal selected from the group consisting of steel, zinc and aluminum having thereon a coating having a thickness between about .1 and .8 mil and being the reaction product of the said metal surface and a composition consisting essentially of 2%–16% basic zinc chromate, 2%–16% of at least one resin selected from the group consisting of polyvinyl butyral, alkyd resins and polyamide resins, a suitable solvent for said resin and 2%–20% of a phosphate selected from the group consisting of a diammonium phosphate, guanylurea phosphate, dimorpholine phosphate and ditrimethyl ammonium phosphate, said composition having a pH between 6 and 9.

References Cited in the file of this patent

UNITED STATES PATENTS

| Number | Name | Date |
|---|---|---|
| 1,428,086 | Gravell | Sept. 5, 1922 |
| 2,318,606 | Goebel | May 11, 1943 |
| 2,385,800 | Douty et al. | Oct. 2, 1945 |
| 2,488,651 | Whiting et al. | Nov. 22, 1949 |
| 2,525,107 | Whiting et al. | Oct. 10, 1950 |